United States Patent [19]
Wulff

[11] Patent Number: 5,685,585
[45] Date of Patent: Nov. 11, 1997

[54] SHEET MATERIAL CARRYING DEVICE

[76] Inventor: Lawrence H. Wulff, Site 18, Comp. 7, RR 4, Vernon, British Columbia, Canada, V1T 6L7

[21] Appl. No.: 656,301
[22] PCT Filed: Dec. 14, 1994
[86] PCT No.: PCT/CA94/00715
    § 371 Date: Jun. 14, 1996
    § 102(e) Date: Jun. 14, 1996
[87] PCT Pub. No.: WO95/16624
    PCT Pub. Date: Jun. 22, 1995

[30] Foreign Application Priority Data

Dec. 16, 1993 [CA] Canada ................ 2111647

[51] Int. Cl.$^6$ ................ B25B 5/08; B25G 7/12
[52] U.S. Cl. ................ 294/16; 294/104; 294/116
[58] Field of Search ................ 294/15, 16, 101, 294/103.1, 104, 106, 113, 116, 164

[56] References Cited

U.S. PATENT DOCUMENTS

| 1,219,979 | 3/1917 | Melia | 294/104 |
| 1,376,856 | 5/1921 | Boardman | 294/104 |
| 1,479,711 | 1/1924 | Haarberg | 294/16 X |
| 1,729,114 | 9/1929 | Louviaux | 294/16 X |
| 1,760,885 | 6/1930 | Prelesnik | 294/104 |
| 1,982,225 | 11/1934 | Miller | 294/16 X |
| 2,776,856 | 1/1957 | Ingram | 294/16 |
| 3,116,084 | 12/1963 | Docken | 294/16 |
| 3,363,927 | 1/1968 | Wesemann | 294/16 |
| 3,374,024 | 3/1968 | Reynolds | 294/16 |
| 3,524,670 | 8/1970 | Ilich | 294/16 |
| 3,756,645 | 9/1973 | Heinemann | 294/116 |
| 4,013,202 | 3/1977 | Russo | 294/16 X |
| 4,349,225 | 9/1982 | Collins et al. | 294/16 |

FOREIGN PATENT DOCUMENTS

| 511968 | 4/1955 | Canada . | |
| 1228095 | 10/1987 | Canada . | |
| 36090 | 2/1912 | Sweden | 294/16 |
| 341953 | 12/1959 | Switzerland . | |
| 987843 | 3/1965 | United Kingdom . | |
| 2019765 | 11/1979 | United Kingdom . | |

*Primary Examiner*—Johnny D. Cherry
*Attorney, Agent, or Firm*—Anthony C. Edwards

[57] ABSTRACT

A sheet material carrying device comprises a U-shaped bracket having first and second legs defining a slot therebetween. The first and second legs have leg ends at the ends of the "U"-shaped bracket. Mounted to the first and second legs respectively are first and second opposed facing jaws. The first leg has at its' end a cam follower. The first jaw is pivotally mounted to the first leg and rotatable into the slot. A first jaw engaging lever, having a cam end and an opposed handle end, is pivotally mounted at its' cam end to the first jaw. The cam end comprises a cam surface, whereby the first jaw engaging lever is rotatable by pivoting the handle end about the first jaw so as to engage the cam surface with the cam follower. The first jaw is thereby forced into the slot to frictionally engage a sheet of material placed therein.

10 Claims, 7 Drawing Sheets

SHEET MATERIAL CARRYING DEVICE

FIELD OF THE INVENTION

The invention relates to the field of clamping tools used in lifting sheets of building materials and in particular relates to a tool having a clamping mechanism whereby a large sheet of material may be held and may be transported by a single person.

BACKGROUND OF THE INVENTION

The building construction industry uses quantities of typically 4 foot by 8 foot sheet materials such as sheets of plywood, particle board, Strandboard™, and Gyproc™. Although these sheets of material are frequently handled in bulk with the aid of heavy equipment, individual sheets of such material are always having to be handled manually at some point in the warehousing, retailing, transportation or in construction using those materials. Although individually those sheets of materials are not extremely heavy, they are typically too bulky for one person to easily and safely manage. In particular, when lifting such sheets of material it is typical to place an awkward strain on the back of the person attempting to lift the sheet of material because of the twisting of the torso to grip the material combined with simultaneous bending of the torso and lifting of the material. It is known that lifting, for example, gyproc sheets in this manner may cause or aggravate back injury.

It is an object of this invention to provide a tool designed to assist the building construction industry by enabling a single person to move bulky sheets of materials such as plywood, particle board, strand board, and gyproc which normally require the efforts of two people to safely and conveniently handle.

It is a further object of this invention to provide a tool which may be simply dropped over an edge of the sheet of material to be transported and by the lifting of the material using the handle provided, frictionally gripping the sheet of material in the tool so that the sheet of material may be lifted using the handle.

In the prior art, U.S. Pat. No. 1,479,711, which issued on Jan. 1, 1924 to Haarberg for a "Portable Handle", and Swedish Patent No. 36,090 which issued Feb. 3, 1912, disclose devices for gripping the planar sides of boxes or the like. Those devices comprise a U-shaped bracket and a pivoting handle pivotally mounted along one leg of the bracket whereby raising the handle forces a box engaging lever into gripping engagement with the side of the box contained within the bracket. Engagement of the lever with the box is by means of a piercing or biting point on the end of the lever opposed to the handle. No means is taught nor suggested for providing a pivotable eccentric cam as in the present invention for forcing a non-marring jaw into frictional engagement with a sheet of material held within the U-shaped bracket.

The applicant is also aware of U.S. Pat. No. 3,524,670 which issued on Aug. 18, 1970 to Ilich for a "Sheet Material Carrier" and Canadian Patent No. 1,228,095 which issued Oct. 13, 1987 to Renfrowe for a "Non-marring Lifting Clamp".

Ilich teaches a sheet material carrier having a U-shaped bracket with gripping shoes attached along the legs of the bracket in opposed facing relationship, one of the gripping shoes being translatable towards the other gripping shoe so as to grip a sheet of material therebetween. The translatable gripping shoe is translated by a wedge-like cam surface being forced between the translatable gripping shoe and the corresponding leg of the bracket. The cam surface is driven by the piston-like action of a carrying handle driving the cam surface between the translatable gripping shoe and the bracket leg.

Renfrowe discloses a sheet material lifting device having a clamp body which defines a "U"-shaped slot. Along the sides of the slot are, in opposed facing relationship, opposed jaws, one of which is pivotally mounted for opening and closing movements relative to the other jaw, which is adjustable. The pivotally mounted jaw is urged towards the opposed adjustable jaw, so as to clamp therebetween a sheet of material placed within the slot, by translating a shackle extending from the clamp body. The shackle acts through a linkage assembly, pivoting a swing link, to which is pivotally mounted the pivotally mounted jaw.

In neither Ilich nor Renfrowe is it taught or suggested to employ a pivoting handle having an eccentric cam surface on one end to urge one jaw towards the other.

SUMMARY OF THE INVENTION

A sheet material carrying device comprises a U-shaped bracket having first and second legs defining a slot therebetween, the first and second legs having leg ends at the ends of the "U"-shaped bracket. Mounted to the first and second legs respectively are first and second opposed facing jaws. The first leg has at its' end a cam follower mounted thereto. The first jaw has first and second ends and is pivotally mounted at the first end to the first leg and rotatable into the slot. A first jaw engaging lever, having a cam end and an opposed handle end, is pivotally mounted at the cam end to the first jaw, the cam end comprising a cam surface. The first jaw engaging lever is rotatable about the first jaw so as to engage the cam surface with the cam follower. The first jaw may be thereby forced into the slot to frictionally engage a sheet of material placed therein.

The second jaw has first and second ends and advantageously is pivotally mounted at the first end to the second leg and rotatable into the slot. The second leg may further have second jaw position adjusting means for engagement with the second jaw to adjustably position into the slot the second jaw relative to the second leg. The second jaw position adjusting means maybe a screw journalled in the second leg substantially at the leg end of the second leg.

The first jaw and the second jaw are elongate members. The second ends of the first and second jaws have advantageously sheet material engaging ends for frictional clamping therebetween of the sheet of material.

The first jaw engaging lever cam surface may be a generally inverted "U"-shaped cavity in the lever, extending laterally through the lever, for sliding fitment over the cam follower, the cam follower being a transverse member or axle mounted at, substantially, the leg end of the first leg. Alternatively, the cam end of the jaw engaging lever may be a hook-like extension of the lever extending from the handle end for sliding engagement with the cam follower.

The first and second legs lie in a first plane, and the first leg, at the leg end of the first leg, may have substantially parallel forks, extending from the first leg, lying in a second plane normal to the first plane. The cam follower is fixed in the second plane mounted transversely between the forks. The adjusting screw and the first jaw engaging lever may lie in the first plane.

The sheet material engaging ends may be protrusions sheathed in resilient material, generally parallel to the second plane, extending perpendicularly from the first and second jaws, the first and second jaws pivotable into the slot and out of the substantially parallel relationship to the second plane when pivoted to engage the sheet of material within the slot.

DETAILED DESCRIPTION OF THE PREFERRED EMBODIMENT

Figure 1:
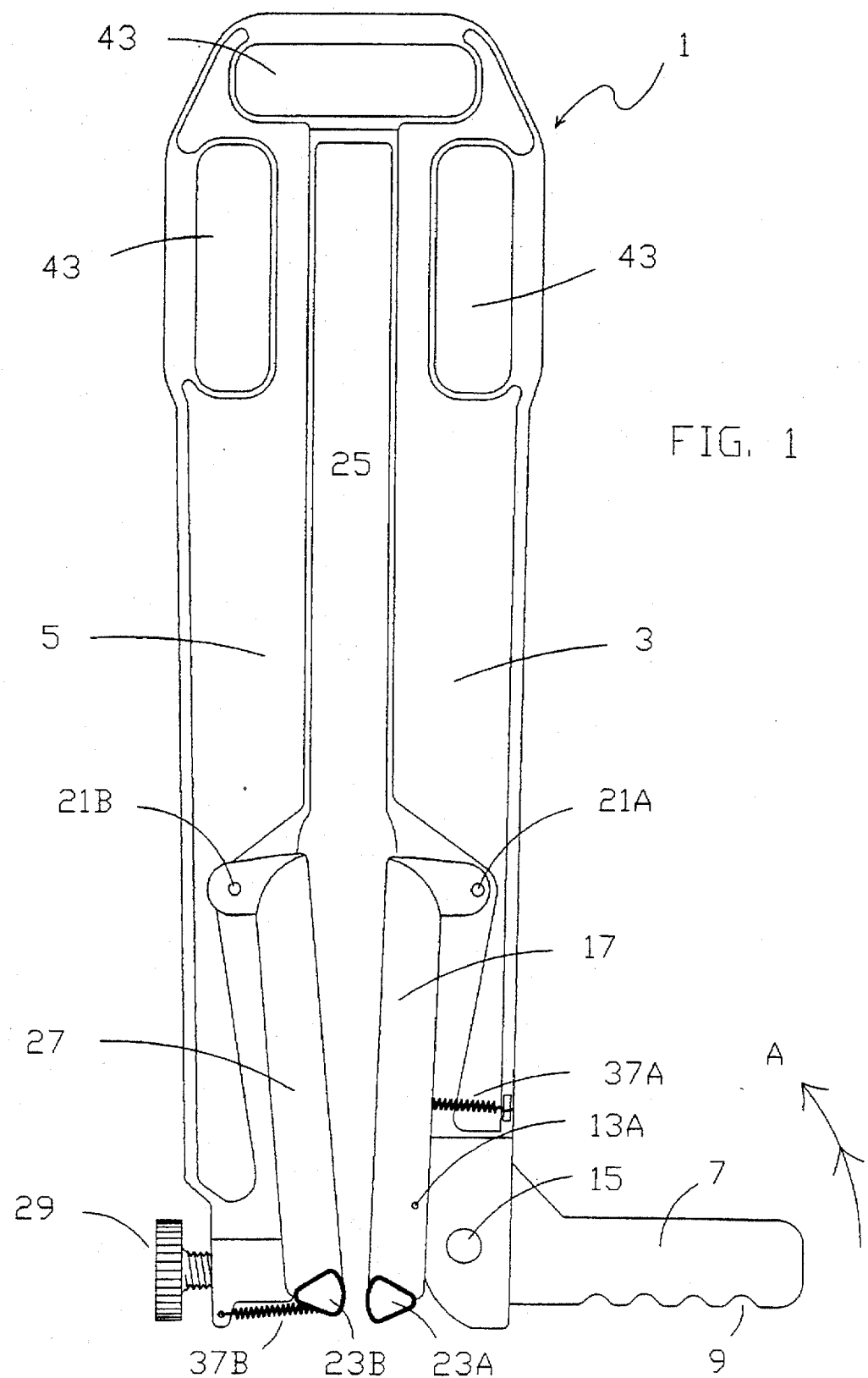
FIG. 1 is, in front elevation view, the sheet material carrying device of the present invention.
Figure 2:
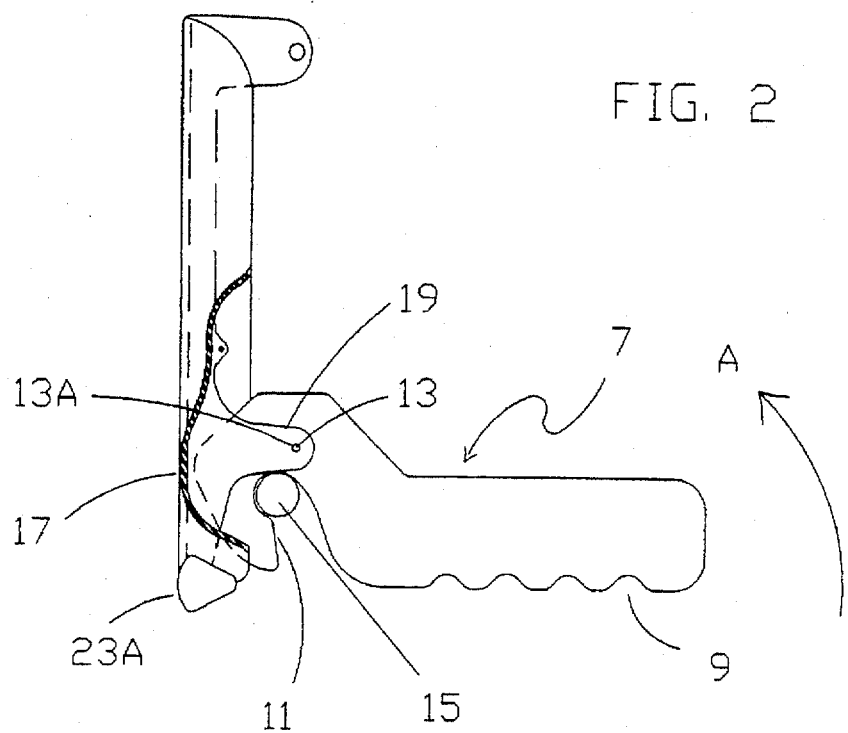
FIG. 2 is, in front elevation, the handle of the sheet material carrying device of FIG. 1.

As illustrated in FIG. 1, sheet material carrying device 1 comprises a bracket having the shape of an inverted "U", the bracket having, extending substantially parallel, handle supporting leg 3 and opposed screw adjustment supporting leg 5. Handle 7 (seen better in FIG. 2) extends generally at right angles from handle supporting leg 3. Handle 7 has grip 9, cam surface 11 and axle 13.

With device 1 assembled, cam surface 11 is hooked over cam follower 15. Handle 7 is pivotally mounted to gripping jaw 17 about axle 13 journalled in holes 13A.

Figure 3:
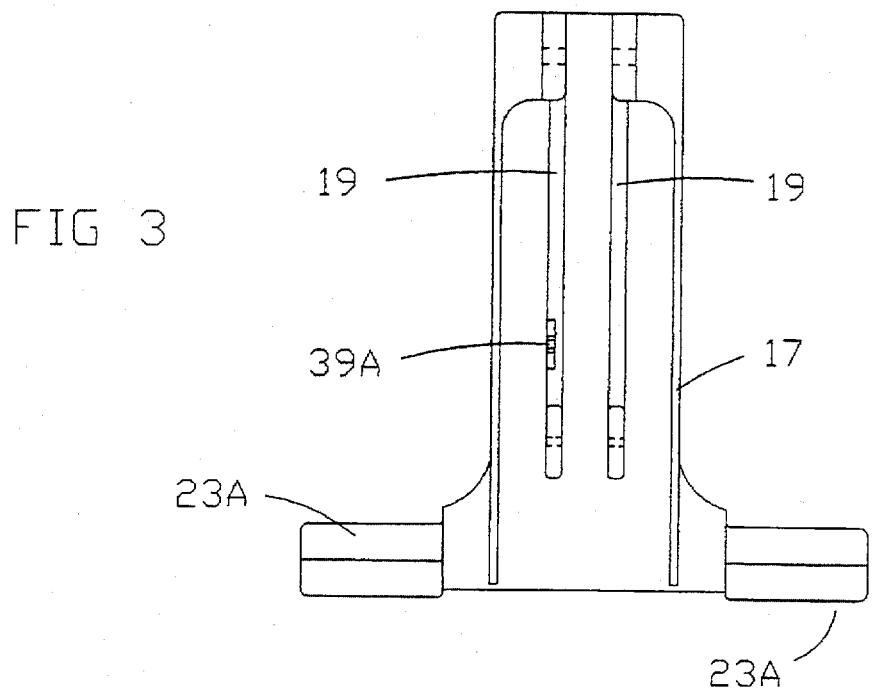
FIG. 3 is, in right side elevation view, the adjustable jaw of the sheet material carrying device of FIG. 1.

Rotating handle 7 in direction A engages cam surface 11 with cam follower 15 forcing gripping jaw 17 away from supporting leg 3. Gripping jaw 17 may be structurally reinforced by reinforcing members or ridges 19 (illustrated in FIG. 3 and in broken outline in FIG. 2) on the back surface of gripping jaw 17. Rotating handle 7 in direction A, urges gripping jaw 17 and in particular sheet material engaging legs 23A into slot 25 between legs 3 and 5. Gripping jaw 17 rotates about axle 21A. Gripping jaw 17 and adjustable jaw 27 are similarly shaped components.

A sheet of material (see sheet 41 in FIG. 8) placed within slot 25 may thereby be gripped between gripping jaw 17 and adjustable jaw 27, and in particular between sheet material engaging legs 23A and 23B. Engaging legs 23A and 23B are generally in the shape of the legs of an inverted "T". Desirably, they must be sufficiently long so that when multiple sheets of material are to be held within slot 25, that if the sheets are offset with respect to one another, and thus have the tendency to rotate relative to each other, sufficiently long engaging legs 23A and 23B provide sufficient resistance to the turning moment exerted by the sheets to prevent slippage. Engaging legs 23A and 23B also usefully form a base so that when sheet material carrying device 1 is not in use, it may be left standing upright.

Figure 6:
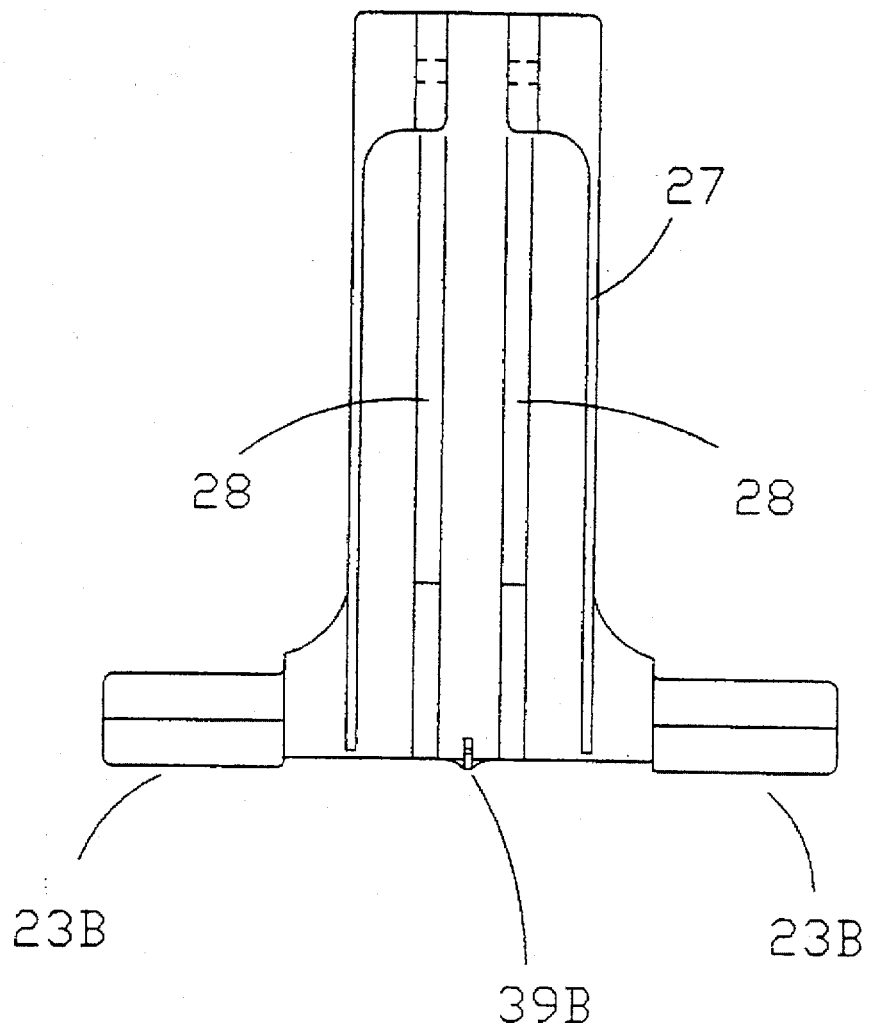
FIG. 6 is, in left side elevation view, the adjustable jaw of the sheet material carrying device of FIG. 1.

Reinforcing members or ridges 19 form a channel which acts as a guide when gripping jaw 17 rotates about axle 21A. Reinforcing members or ridges 19 snugly fit over interior surface 3A of leg 3. Interior surface 3A thus provides a bearing surface for reinforcing members or ridges 19 to resist the turning moment of sheets 41 held in slot 25. Adjustable jaw 27 has, as illustrated in FIG. 6, reinforcing members or ridges 28, similar to reinforcing members or ridges 19, to bear against interior surface 5A of leg 5.

Figure 4:
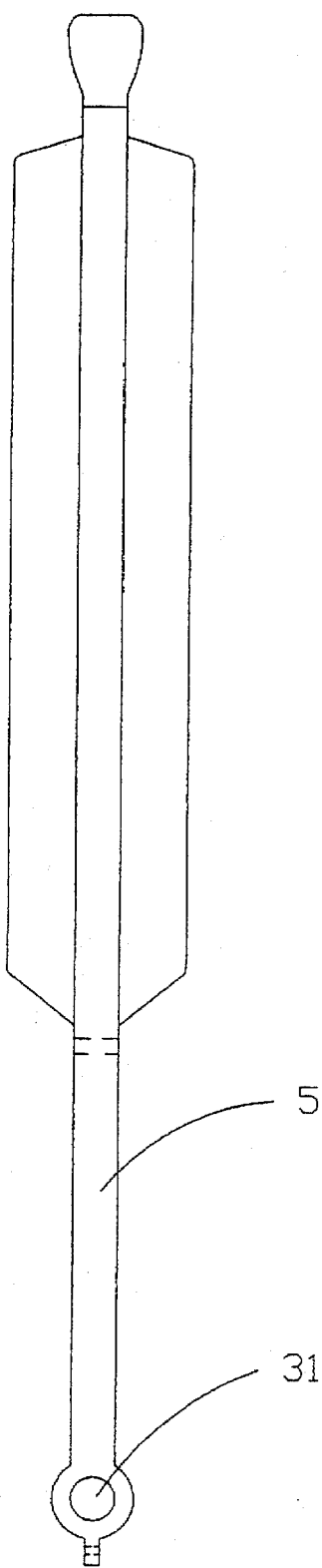
FIG. 4 is, in left side elevation view, the "U"-shaped bracket of the sheet material carrying device of FIG. 1.
Figure 5:
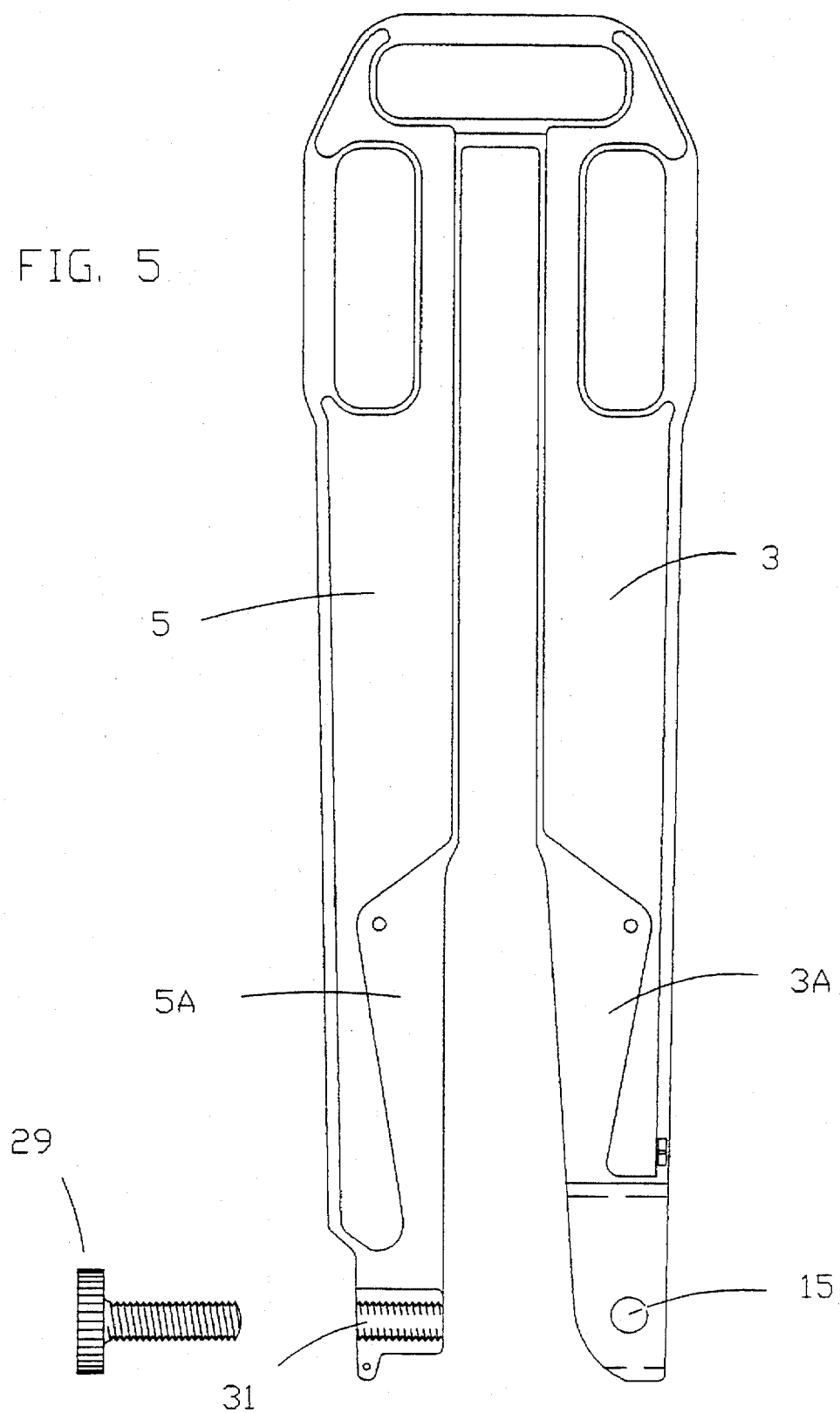
FIG. 5 is, in front elevation view, partially exploded, the "U"-shaped bracket and adjustment screw of the sheet material carrying device of FIG. 1.

Adjustable jaw 27 may be pivoted about pin 21B by rotating adjusting screw 29 journalled in threaded bore 31 (best seen in FIGS. 4 and 5). Adjusting screw 29 when threaded through bore 21, engages the back surface of adjustable jaw 27 (see FIG. 6).

Gripping legs 23A and 23B may have resilient covers of rubber, plastic or like material so as not to mar sheet material 41 held in slot 25. With sheet material 41 pinched between gripping legs 23A and 23B, the pivoting action of gripping jaw 17 and adjustable jaw 27 forces sheet material 41 up into slot 25 so as to force the top of sheet material 41 snugly against the apex of the slot. This has been found advantageous when transporting multiple sheets of material in awkward circumstances such as staircases where the tendency of the material is to slip relative to each other.

Figure 7:
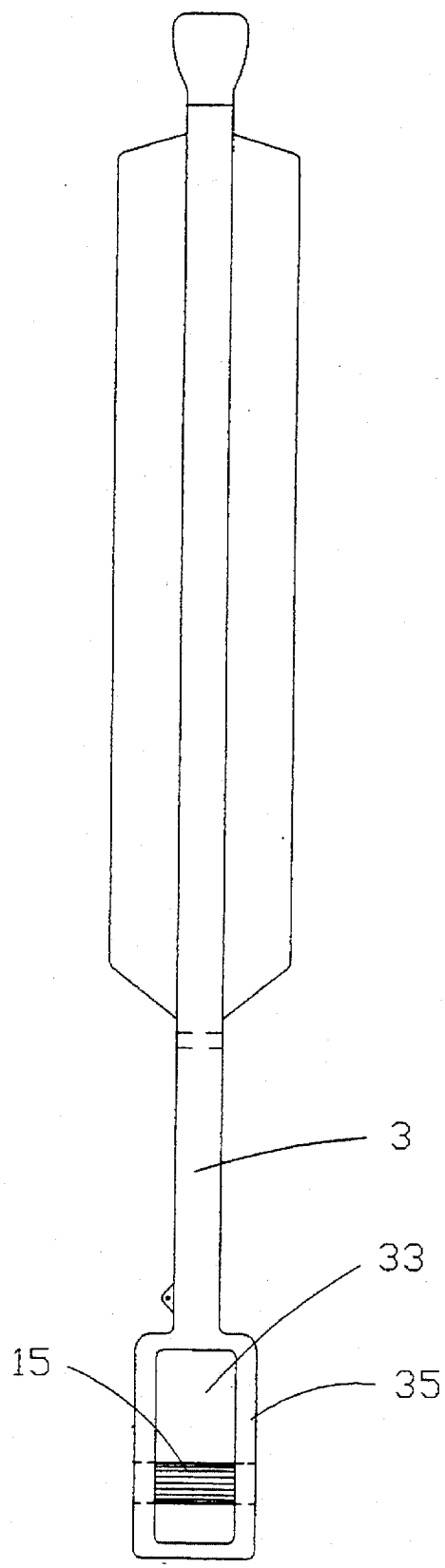
FIG. 7 is, in right side elevation view, the "U"-shaped bracket and transverse axle of the sheet material carrying device of FIG. 1.

As illustrated in FIG. 7, handle supporting leg 3 defines, at its' end, cavity 33 within axle mount 35. Axle mount 35 supports transverse cam follower 15. Cavity 33 is sufficiently large to accommodate the end of handle 7 opposite grip 9 when cam surface 11 is fitted over cam follower 15.

Jaws 17 and 27 may have springs 37A and 37B, respectively, attached at spring attachment points 39A and 39B. Springs 37A and 37B are connected at their other ends to legs 3 and 5 so as to provide return biasing forces between jaws 17 and 27 and legs 3 and 5, respectively.

Figure 8:
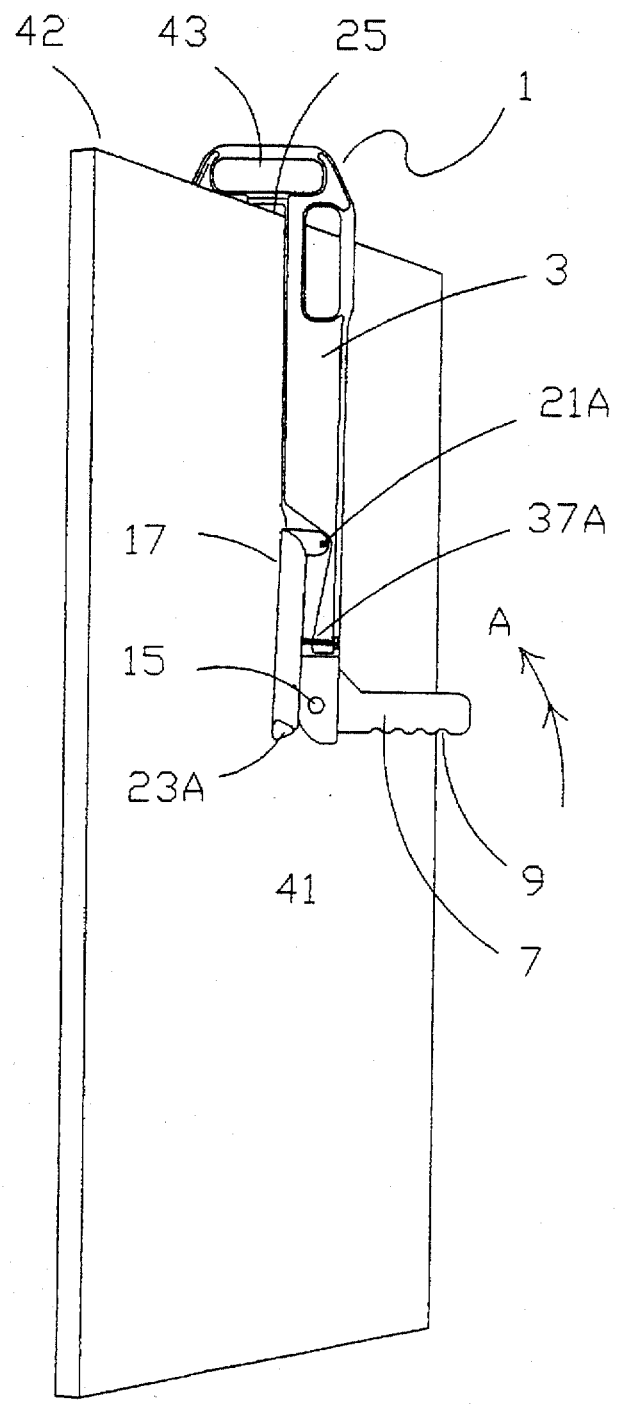
FIG. 8 is, in perspective view, the device of FIG. 1 mounted on a sheet of material.

As illustrated in FIG. 8, sheet material carrying device 1 may be used by placing sheet material 41 within slot 25, or, to the same effect, sliding sheet material carrying device 1 over sheet material 41 so as to place legs 3 and 5 on either side of sheet material 41. Sheet material 41 is then lifted by the user placing an arm over sheet material 41 alongside handle supporting leg 3 and grasping grip 9 of handle 7 so as to rotate handle 7 in direction A thereby gripping sheet material 41 between jaws 17 and 27. Top edge 42 of sheet material 41 is thus supported within slot 25 so that sheet material 41 may be transported by a single person.

Carrying handles 43 are provided for ease of transportation of sheet material carrying device 1 and to assist in initially picking up sheet material 41 when sheet material 41 is lying flat with device 1 in place.

As will be apparent to those skilled in the art in the light of the foregoing disclosure, many alterations and modifications are possible in the practice of this invention without departing from the spirit or scope thereof. Accordingly, the scope of the invention is robe construed in accordance with the substance defined by the following claims.

What is claimed is:

1. A sheet material carrying device comprising a U-shaped bracket having first and second legs defining a slot therebetween, said first and second legs having leg ends at the ends of said "U"-shaped bracket, and mounted to said first and second legs respectively first and second opposed facing jaws, said first leg having at substantially said leg end a cam follower mounted thereto, said first jaw having first and second ends, said first jaw pivotally mounted at said first end to said first leg and rotatable into said slot, a first jaw engaging lever, having a cam end comprising a cam surface and an opposed handle end, said first jaw engaging lever pivotally mounted at said cam end to said first jaw, said first jaw engaging lever rotatable about said first jaw so as to engage said cam surface with said cam follower, whereby said first jaw may be forced into said slot to frictionally engage a sheet of material placed therein.

2. The device of claim 1 wherein said second jaw has first and second ends and is pivotally mounted at said first end to said second leg and rotatable into said slot, said second leg further comprising second jaw position adjusting means for engagement with said second jaw to adjustably position into said slot said second jaw relative to said second leg.

3. The device of claim 2 wherein said first jaw and said second jaw are elongate members, said first and second ends of said first and second jaws comprising sheet material engaging ends for frictional clamping therebetween of said sheet of material.

4. The device of claim 3 wherein said second jaw position adjusting means comprises a screw journalled in said second leg substantially at said leg end of said second leg, and wherein said handle end of said first jaw engaging lever extends substantially perpendicularly outwardly from said first leg, wherein said first jaw engaging lever cam surface on said cam end is a generally inverted "U"-shaped cavity in said lever, extending laterally through said lever, for sliding fitment over said cam follower, and wherein said cam follower comprises a transverse member mounted at, substantially, said leg end of said first leg.

5. The device of claim 3 wherein said cam end of said jaw engaging lever comprises a hook-like extension of said lever extending from said handle end for sliding engagement with said cam follower, and wherein said cam follower comprises an axle-like member transversely mounted at, substantially, said leg end of said first leg, and wherein said second jaw position adjusting means comprises an adjustable member journalled in said leg end of said second leg.

6. The device of claim 5 wherein said first and second legs lie in a first plane, and wherein said first leg, at said leg end of said first leg, has substantially parallel forks, extending from said first leg, lying in a second plane normal to said first plane, said axle-like member lying in said second plane mounted transversely between said forks.

7. The device of claim 6 wherein said adjustable member and said first jaw engaging lever lie in said first plane.

8. The device of claim 7 wherein said sheet material engaging ends comprise protrusions generally parallel to said second plane, extending perpendicularly from said first and second jaws, said first and second jaws pivotable into said slot and out of said substantially parallel relationship to said second plane when pivoted to engage said sheet of material within said slot.

9. The device of claim 8 wherein said first jaw is biased against said cam end of said first jaw engaging lever by spring biasing means, said second jaw is biased against said adjustable member by spring biasing means, and said adjustable member comprises a screw.

10. The device of claim 9 wherein said sheet of material engaging ends are sheathed in a resilient material.

* * * * *